US012688045B2

(12) United States Patent
Kalyanam et al.

(10) Patent No.: US 12,688,045 B2
(45) Date of Patent: Jul. 21, 2026

(54) NON-PERIODIC POWER, CURRENT, AND THERMAL LIMITS MANAGEMENT

(71) Applicant: QUALCOMM Incorporated, San Diego, CA (US)

(72) Inventors: Vijay Kiran Kalyanam, Austin, TX (US); Todd Robert Sutton, Del Mar, CA (US); Suresh Kumar Venkumahanti, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 18/789,509

(22) Filed: Jul. 30, 2024

(65) Prior Publication Data

US 2026/0037269 A1     Feb. 5, 2026

(51) Int. Cl.
| | |
|---|---|
| *G06F 1/00* | (2006.01) |
| *G06F 1/28* | (2006.01) |
| *G06F 9/38* | (2018.01) |
| *G06F 1/30* | (2006.01) |

(52) U.S. Cl.
CPC .............. *G06F 9/3869* (2013.01); *G06F 1/28* (2013.01); *G06F 1/30* (2013.01)

(58) Field of Classification Search
CPC ................................. G06F 9/3869; G06F 1/28
USPC ......................................................... 713/340
See application file for complete search history.

(56) References Cited

U.S. PATENT DOCUMENTS

| | | | | |
|---|---|---|---|---|
| 8,086,910 B1* | 12/2011 | Koktan | ............... | G06F 11/3423 |
| | | | | 714/52 |
| 8,365,014 B2* | 1/2013 | Lynn | ..................... | G06F 9/5016 |
| | | | | 714/11 |
| 9,874,926 B2* | 1/2018 | Hum | ..................... | G06F 1/3206 |
| 11,768,715 B1* | 9/2023 | Eltantawy | ............. | G06F 9/4881 |
| | | | | 718/106 |
| 11,842,217 B1* | 12/2023 | Christopher | .......... | G06F 9/5083 |
| 2006/0161762 A1* | 7/2006 | Eisen | ..................... | G06F 9/3844 |
| | | | | 712/E9.053 |
| 2007/0204267 A1* | 8/2007 | Cole | ..................... | G06F 9/3888 |
| | | | | 712/E9.047 |
| 2011/0016337 A1* | 1/2011 | Cepulis | .................. | G06F 1/206 |
| | | | | 713/340 |
| 2012/0084790 A1* | 4/2012 | Elshishiny | ............ | G06F 9/4893 |
| | | | | 718/108 |
| 2014/0007114 A1* | 1/2014 | Wang | ..................... | G06F 3/0653 |
| | | | | 718/102 |
| 2017/0344102 A1* | 11/2017 | Kolla | ....................... | H02M 1/08 |
| 2018/0232034 A1* | 8/2018 | DiBene | ................. | G06F 1/3203 |
| 2018/0349191 A1* | 12/2018 | Dorsey | ................. | G06F 9/5044 |

(Continued)

OTHER PUBLICATIONS

International Search Report and Written Opinion—PCT/US2025/033088—ISA/EPO—Sep. 4, 2025.

*Primary Examiner* — Volvick Derose
(74) *Attorney, Agent, or Firm* — Seyfarth Shaw LLP

(57) ABSTRACT

A method for non-periodic limits mitigation is described. The method includes monitoring operation of each processor thread during thread pipeline execution. The method also includes detecting a limits management condition based on each of the processor threads during the thread pipeline execution. The method further includes controlling application of a limits mitigation operation to perform non-periodic application of the limits mitigation operation to the thread pipeline execution.

17 Claims, 6 Drawing Sheets

(56)          References Cited

U.S. PATENT DOCUMENTS

| | | | |
|---|---|---|---|
| 2019/0102274 A1* | 4/2019 | Abu Salah | G06F 9/505 |
| 2020/0089308 A1* | 3/2020 | Dai | G06F 1/324 |
| 2020/0201671 A1* | 6/2020 | Samih | G06F 9/5011 |
| 2020/0341533 A1* | 10/2020 | Ho | G06F 1/3296 |
| 2021/0294400 A1* | 9/2021 | Thomas | G06F 1/206 |
| 2021/0397487 A1* | 12/2021 | Khanna | H04L 69/325 |
| 2022/0197367 A1* | 6/2022 | Kirubakaran | G06F 1/3228 |
| 2022/0413720 A1* | 12/2022 | Purandare | G06F 3/0625 |
| 2024/0111684 A1* | 4/2024 | Gurumurthy | G06F 12/0897 |
| 2025/0004516 A1* | 1/2025 | Popovic | G06F 1/329 |
| 2025/0368198 A1* | 12/2025 | Kobilarov | B60W 30/0956 |

* cited by examiner

100

102 — CPU

104 — GPU

106 — DSP

108 — NPU

110 — CONNECTIVITY

112 — MULTIMEDIA

114 — SENSORS

116 — ISPs

118 — MEMORY

120 — NAVIGATION

400

402

MONITOR OPERATION OF EACH PROCESSOR THREAD DURING
THREAD PIPELINE EXECUTION

404

DETECT A LIMITS MANAGEMENT CONDITION BASED ON EACH OF THE
PROCESSOR THREADS DURING THE THREAD PIPELINE EXECUTION

406

CONTROL APPLICATION OF A LIMITS MITIGATION OPERATION TO
PERFORM NON-PERIODIC APPLICATION OF THE LIMITS MITIGATION
OPERATION TO THE THREAD PIPELINE EXECUTION

NON-PERIODIC POWER, CURRENT, AND THERMAL LIMITS MANAGEMENT

BACKGROUND

Field of the Disclosure

Aspects of the present disclosure relate to processors of integrated circuits (ICs) and more specifically to non-periodic power, current, and thermal limits management.

Background

High performance machine learning/artificial intelligence accelerators, central processing units (CPUs), and graphics processing units (GPU) rely on various limits mitigation solutions to prevent operation violations. For example, thread limits management hardware (TLMH) as well as dynamic clock voltage scaling (e.g., thermal mitigation) are relied on to prevent operation violations of constraints imposed by various components such as power management integrated circuits (PMICs), voltage regulators, batteries, cooling solutions, and the like. Unfortunately, power/thermal limits management solutions can generate frequent periodic oscillations due to engaging and dis-engaging of processor controls, which induces undesired resonance at high, mid, or low-frequency bands. These power/thermal limits management solutions include clock changes, frequency switching, stalls via issue-control in a processor pipeline, and the like. A solution for non-periodic power, current, and thermal limits management is desired.

SUMMARY

A method for non-periodic limits mitigation is described. The method includes monitoring operation of each processor thread during thread pipeline execution. The method also includes detecting a limits management condition based on each of the processor threads during the thread pipeline execution. The method further includes controlling application of a limits mitigation operation to perform non-periodic application of the limits mitigation operation to the thread pipeline execution.

A non-periodic limits mitigation system is described. The non-periodic limits mitigation system includes a multi-threaded processor having a dither control circuit. The dither control circuit is configured to control application of a limits mitigation operation to perform non-periodic application of the limits mitigation operation to a thread pipeline execution when a limits management condition is detected based on the thread pipeline execution of the multi-threaded processor.

This has outlined, broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for conducting the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

DETAILED DESCRIPTION

Figure 1:
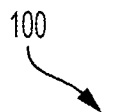
FIG. 1 illustrates an example implementation of a host system-on-chip (SoC), which is configured for non-periodic power, current, and thermal limits management, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form to avoid obscuring such concepts.

As described herein, the use of the term "and/or" is intended to represent an "inclusive OR," and the use of the term "or" is intended to represent an "exclusive OR." As described herein, the term "exemplary" used throughout this description means "serving as an example, instance, or illustration," and should not necessarily be construed as preferred or advantageous over other exemplary configurations. As described herein, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described herein, the term "proximate" used throughout this description means "adjacent, very near, next to, or close to." As described herein, the term "on" used throughout this description means "directly on" in some configurations, and "indirectly on" in other configurations.

High performance machine learning/artificial intelligence accelerators, central processing units (CPUs), and graphics processing units (GPU) rely on various limits mitigation solutions to prevent operation violations. For example, thread limits mitigation hardware (TLMH) as well as dynamic clock voltage scaling (e.g., thermal mitigation) are relied on to prevent operation violations of constraints imposed by various components such as power management integrated circuits (PMICs), voltage regulators, batteries, cooling solutions, and the like. Unfortunately, power/thermal limits management solutions can generate frequent periodic oscillations due to engaging and dis-engaging of processor controls, which induces undesired resonance at high, mid, or low-frequency bands. These power/thermal limits management solutions include clock changes, frequency switching, stalls via issue-control in a processor pipeline, and the like.

Existing limits management solutions (e.g., current/power/voltage regulator/battery/thermal) do not inherently prevent the occurrence of undesired periodic oscillations. A large magnitude/amplitude of current in the high, mid, or low-frequency bands' resonant bands can induce a large magnitude of high, mid, or low-frequency voltage droops. These voltage droops increase a minimum voltage of operation (Vmin), which leads to increased power consumption and thermal issues. Unfortunately, relying on an external entity such as a voltage droop mitigation circuit after the problem has been induced by the limits management solutions as a reaction to the problem is usually undesirable.

Additionally, voltage noise is a problem that continually degrades in future products due to usage of lower cost PMICs and power distribution network (PDN) components. As the voltage noise problem becomes more acute, a potential system failure becomes inevitable due to the voltage noise. Reliability concerns also become an issue due to the potential system failures due to the voltage noise. Lower quality of service (QoS) is a further issue due to a potential buzzing sound that is audible during phone usage in a predetermined range (e.g., 20-20 kilohertz (kHz)). This potential buzzing sound does not result in voltage droop. In such scenarios, existing voltage droop mitigation mechanisms cannot improve the lower QoS. A solution for non-periodic power, current, and thermal limits management for overcoming a current limits condition, a power limits condition, and/or a thermal limits condition (e.g., a limits management condition), is desired.

Various aspects of the present disclosure are directed to non-periodic power, current, and thermal limits management. Various aspects of the present disclosure mitigate periodic oscillation introduced by power/thermal limits solutions. In some aspects of the present disclosure, a non-periodic limits management solution is implemented via a processor dither control. When a processor limits solution engages, the dither control perturbs the mitigation to alleviate the periodic oscillations by making the limits solution non-periodic and/or by introducing non-periodic perturbations during limits decision making.

FIG. 1 illustrates an example implementation of a system-on-chip (SoC) 100, which is configured for non-periodic power, current, and thermal limits management, in accordance with various aspects of the present disclosure. The SoC 100 includes processing blocks tailored to specific functions, such as a connectivity block 110. The connectivity block 110 may include sixth generation (6G), connectivity fifth generation (5G) new radio (NR) connectivity, fourth generation long term evolution (4G LTE) connectivity, Wi-Fi connectivity, USB connectivity, Bluetooth® connectivity, Secure Digital (SD) connectivity, and the like.

In this configuration, the SoC 100 includes various processing units that support multi-threaded operation. For the configuration shown in FIG. 1, the SoC 100 includes a multi-core central processing unit (CPU) 102, a graphics processor unit (GPU) 104, a digital signal processor (DSP) 106, and a neural processor unit (NPU) 108. The SoC 100 may also include a sensor processor 114, image signal processors (ISPs) 116, a navigation module 120, which may include a global positioning system, and a memory 118. The multi-core CPU 102, the GPU 104, the DSP 106, the NPU 108, and the multimedia engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

During operation, the processors of the SoC 100 rely on various limits mitigation solutions to prevent operation violations. For example, thread limits management hardware (TLMH) as well as dynamic clock voltage scaling (e.g., thermal mitigation) are relied on to prevent operation violations of constraints imposed by various components, such as power management integrated circuits (PMICs), voltage regulators, batteries, cooling solutions, and the like. Unfortunately, power/thermal limits management solutions of the NPU 108 can generate frequent periodic oscillations due to engaging and dis-engaging of processor controls, which induces undesired resonance at high, mid, or low-frequency bands. Unfortunately, existing limits management solutions (e.g., current/power/voltage regulator/battery/thermal) of the NPU 108 do not inherently prevent the occurrence of undesired periodic oscillations.

Figure 2:
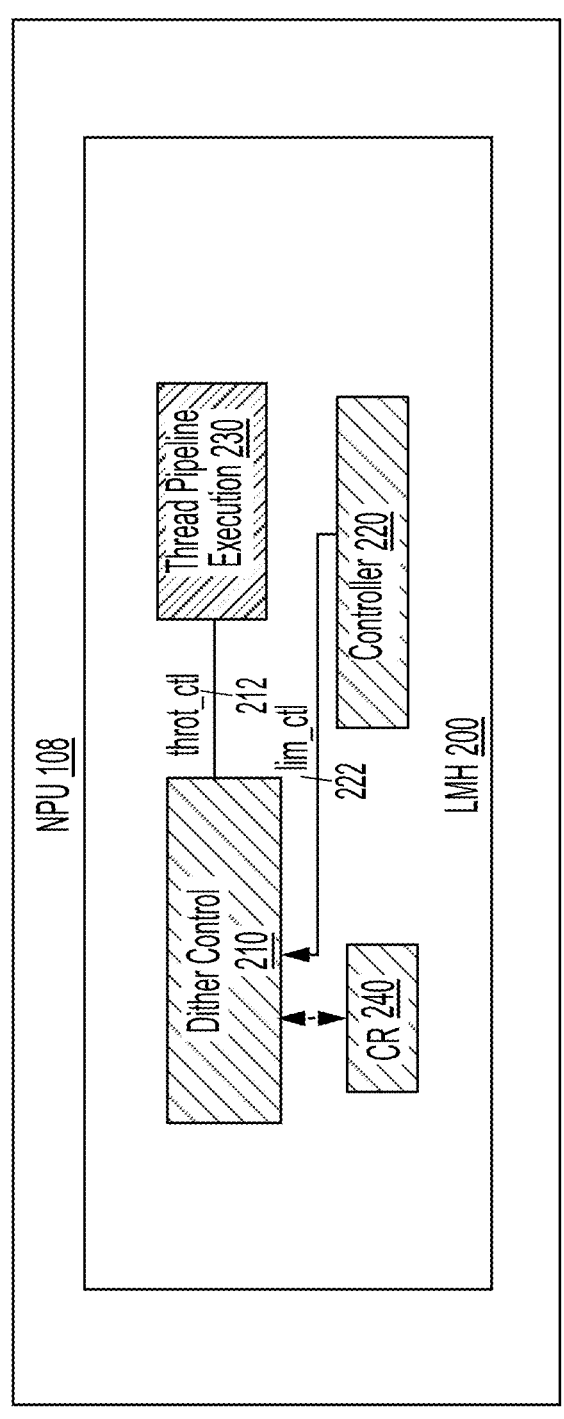
FIG. 2 is a block diagram illustrating a multi-threaded processor configured for non-periodic power, current, and thermal limits management, in accordance with various aspects of the present disclosure.

FIG. 2 is a block diagram illustrating a multi-threaded processor configured for non-periodic power, current, and thermal limits management, in accordance with various aspects of the present disclosure. As shown in FIG. 2, a neural processor unit (NPU) 108 includes a limits management hardware (LMH) system 200 configured with non-periodic power, current, and thermal limits management, in accordance with various aspects of the present disclosure. Although shown as implemented in the NPU 108, the LMH system 200 configured with non-periodic limits management may be implemented in any of the processors (e.g., the multi-core CPU 102, the GPU 104, the DSP 106, and/or the NPU 108) of the SoC 100.

According to various aspects of the present disclosure, the LMH system 200 of the NPU 108 includes a dither control 210 configured with non-periodic limits management. According to various aspects of the present disclosure, the dither control 210 perturbs the limits mitigation provided by the LMH system 200 to alleviate periodic oscillations by making the mitigation non-periodic and/or inducing non-periodic perturbations during limits decision making. In this example, the dither control 210 utilizes configuration registers (CR) 240 in response to a limits control signal (lim_ctl) 222 from a controller 220. In this implementation, the dither control 210 is configured by accessing configuration register values from the CR 240 to perturb application of the limits mitigation operation specified by the limits control signal lim_ctl 222. Additionally, the controller 220 is configured for monitoring operation of a thread pipeline execution 230 (e.g., processor pipeline execution units) to detect various limits management conditions (e.g., power, current, and/or thermal limits management conditions).

As shown in FIG. 2, the NPU 108 is configured for multithreaded execution of multiple processor threads utilizing a thread pipeline execution 230. In conventional operation, the controller 220 issues limits mitigation through the limits control signal lim_ctl 222 to the processor thread executing in the thread pipeline execution 230 (e.g., thread pipeline execution units). In various aspects of the present disclosure, the dither control 210 alleviates periodic oscillations caused by the limits mitigation on the processor threads executed in the thread pipeline execution 230. In this example, the dither control 210 provides a throttle control signal (throt_ctl) 212 to control operation of the thread pipeline execution 230 of the NPU 108 during the limits mitigation specified by the limits control signal lim_ctl 222.

According to various aspects of the present disclosure, the dither control 210 applies the throttle control signal (throt_ctl) 212 to the thread pipeline execution 230 for perturbing the limits mitigation to alleviate the undesired periodic oscillations. For example, the periodic oscillations induced by the limits mitigation are converted to non-periodic and/or non-periodic perturbations can be introduced during limits decision making. In some implementations, the dither control 210 modulates feeding of the throttle control signal throt_ctl 212 to the thread pipeline execution 230 for mitigating the periodic oscillation induced by the limits mitigation operations.

Figure 3:
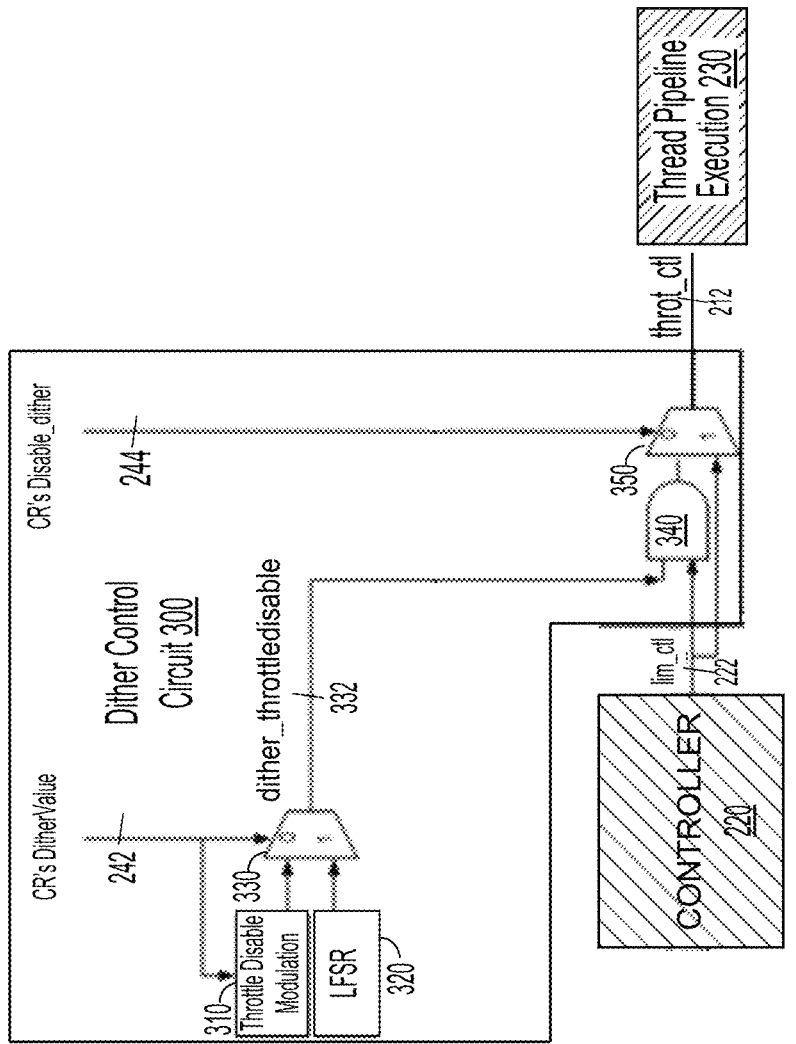
FIG. 3 is a block diagram illustrating a dither-control circuit of a thread limits mitigation hardware (TLMH) of the neural processor unit (NPU) of FIG. 2, in accordance with various aspects of the present disclosure.
Figure 3:

FIG. 3 is a block diagram illustrating a dither control circuit of a limits management hardware (LMH) device of the NPU of FIG. 2, in accordance with various aspects of the present disclosure. In this example, a dither control circuit 300 utilizes a throttle disable modulation block 310 to provide pulse modulation for perturbing (e.g., modulating application of) a limits mitigation specified by the limits control signal lim_ctl 222. Alternatively, the dither control circuit 300 utilizes a random number generator block 320 (e.g., a linear feedback shift register (LFSR)) to modify limits mitigation specified by the limits control signal lim_ctl 222. As shown in FIG. 3, the dither control circuit 300 provides a non-periodic limits mitigation system, according to various aspects of the present disclosure.

In this example, selection between the throttle disable modulation block 310 and the random number generator block 320 is performed at a first multiplexer 330 according to a dither value signal 242 specified by the CR 240. The first multiplexer 330 outputs a dither_throttledisable signal 332, which is provided to an AND logic gate 340 as well as the limits control signal lim_ctl 222 from the controller 220. Additionally, an output of the AND logic gate 340 and the limits control signal lim_ctl 222 from the controller 220 are fed to a second multiplexer 350. Selection between the dither_throttledisable signal 332 and the limits control signal lim_ctl 222 is performed at the second multiplexer 350 according to a disable dither signal 244 (CR's Disable_dither) specified by the CR 240 to output the throt_ctl signal 212.

During operation of the dither control circuit 300, when the disable dither signal 244 is asserted (e.g., CR's Disable_dither=1), the dither-control functionality of the dither control circuit is bypassed and the limits control signal lim_ctl 222 directly drives the throt_ctl signal 212. Conversely, when the disable dither signal 244 is deasserted (e.g., CR's Disable_dither=0), the dither control circuit 300 drives a dither induced no throttle (e.g., the dither_throttledisable signal 332) signal high or low every clock cycle to modify the limits control signal lim_ctl 222 to generate an updated, throt_ctl signal 212. Additionally, based on the value set in the dither value signal 242 (e.g., CR's Dither-Value), either dithering with the throttle disable modulation block 310 or dithering through the random number generator block 320 disable modulation functionality is applied.

In some implementations, the throttle disable modulation block 310 generates a predetermined number (e.g., 128 or 192) of the dither_throttledisable signal 332 every predetermined number (e.g., 256) cycles. Both the throttle disable modulation block 310 functionality and the random number generator block 320 functionality provide random pulses for dither-control of the limits control signal lim_ctl 222 that drives the throt_ctl signal 212, thus alleviating any periodicity and preventing any potential ringing noise on the power-delivery-network (PDN). According to various aspects of the present disclosure, the dither control circuit 300 operates by controlling application of a limits mitigation operation to perform non-periodic application of the limits mitigation operation to the thread pipeline execution 230.

According to various aspects of the present disclosure, modulation of the limits mitigation engagement via a randomized control approach breaks the limits mitigation from regularly repeating after a fixed time (e.g., periodic). Optionally, scheduling decisions can also be non-periodic. As shown in FIG. 3, usage of pulse modulation from the throttle disable modulation block 310 and random number generation from the random number generator block 320 modifies the original mitigation decision specified within the limits loop by the limits control signal lim_ctl 222. This approach prevents the occurrence of periodic engaging/dis-engaging of the limits mitigation specified by the limits control signal lim_ctl 222.

Because power/thermal limits management solutions can generate frequent periodic oscillation of engaging and dis-engaging the processor controls, these limits management solutions induce resonance at high, mid, or low-frequency bands. Modulation of limits mitigation engagement via dither control further mitigates voltage noise while using lower cost PMIC/PDN components. Additionally, modulation of limits mitigation engagement via dither control lowers voltage droop by decreasing a minimum voltage of operation (Vmin) as well as decreasing power consumption and thermal generation. This dither control solution provides better reliability due to preventing system failures caused by voltage noise. Additionally, better QoS is achieved by eliminating a buzzing sound audible in a phone usage through non-periodic limits management. A process for non-periodic limits mitigation is shown, for example, in FIG. 4.

Figure 4:
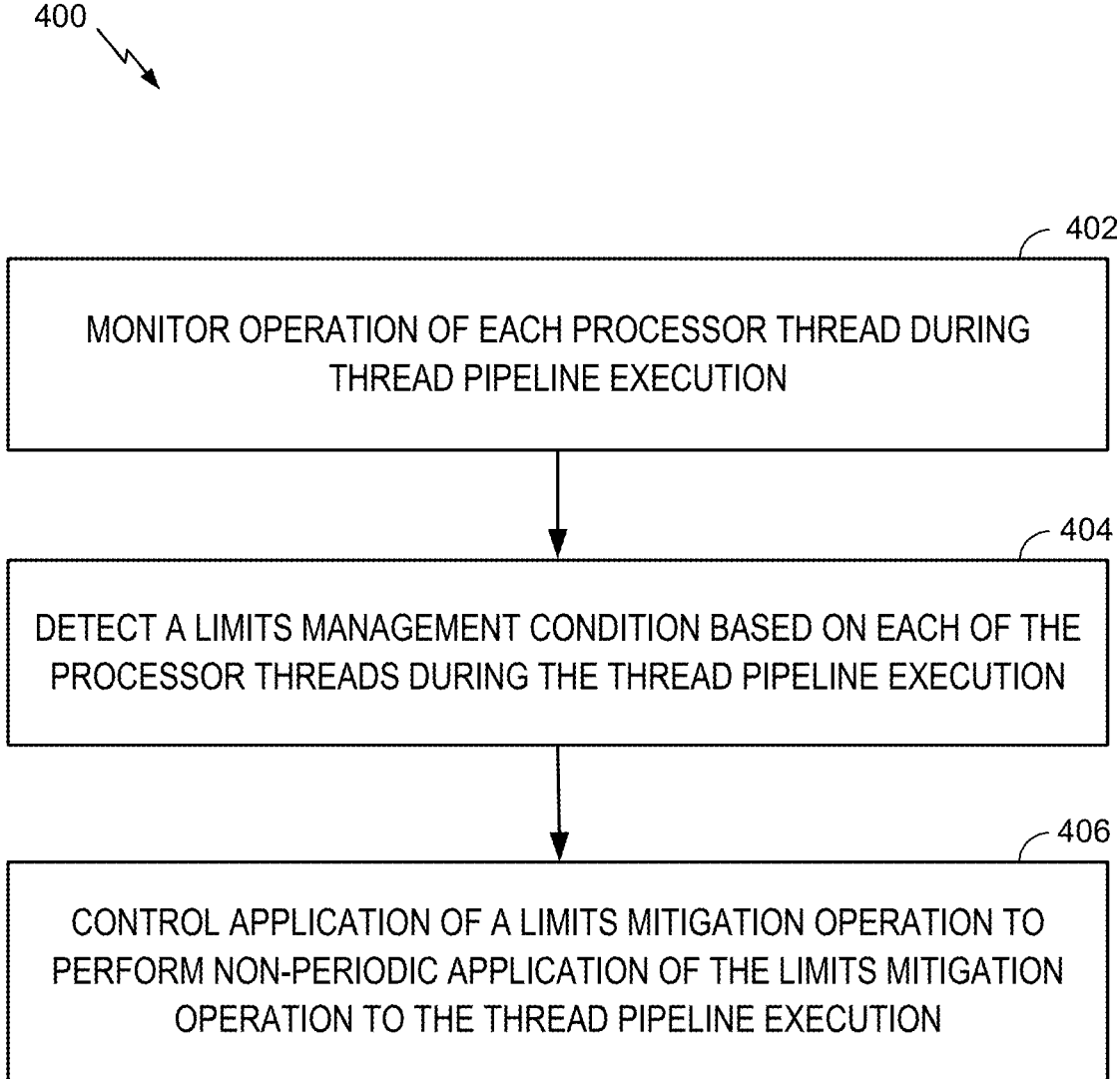
FIG. 4 is a process flow diagram illustrating a method for non-periodic power, current, and thermal limits management, according to various aspects of the present disclosure.

FIG. 4 is a process flow diagram illustrating a method 400 for non-periodic limits mitigation, according to various aspects of the present disclosure. The method 400 begin at block 402, in which operation of each processor thread is monitored during thread pipeline execution. At block 404, a limits management condition is detected based on each of the processor threads during the thread pipeline execution. For example, as shown in FIG. 2, the controller 220 is configured for monitoring operation of a thread pipeline execution 230 (e.g., processor pipeline execution units) to detect various limits management conditions (e.g., power, current, and/or thermal limits management conditions).

At block 406, application of a limits mitigation operation is controlled to perform non-periodic application of the limits mitigation operation to the thread pipeline execution. For example, as shown in FIG. 2, the dither control 210 applies the throttle control signal (throt_ctl) 212 to the thread pipeline execution 230 for perturbing the limits mitigation to alleviate the undesired periodic oscillations. For example, the periodic oscillations induced by the limits mitigation are converted to non-periodic and/or non-periodic perturbations can be introduced during limits decision making. In some implementations, the dither control 210 modulates feeding of the throttle control signal throt_ctl 212 to the thread pipeline execution 230 for mitigating the periodic oscillation induced by the limits mitigation operations.

Figure 5:
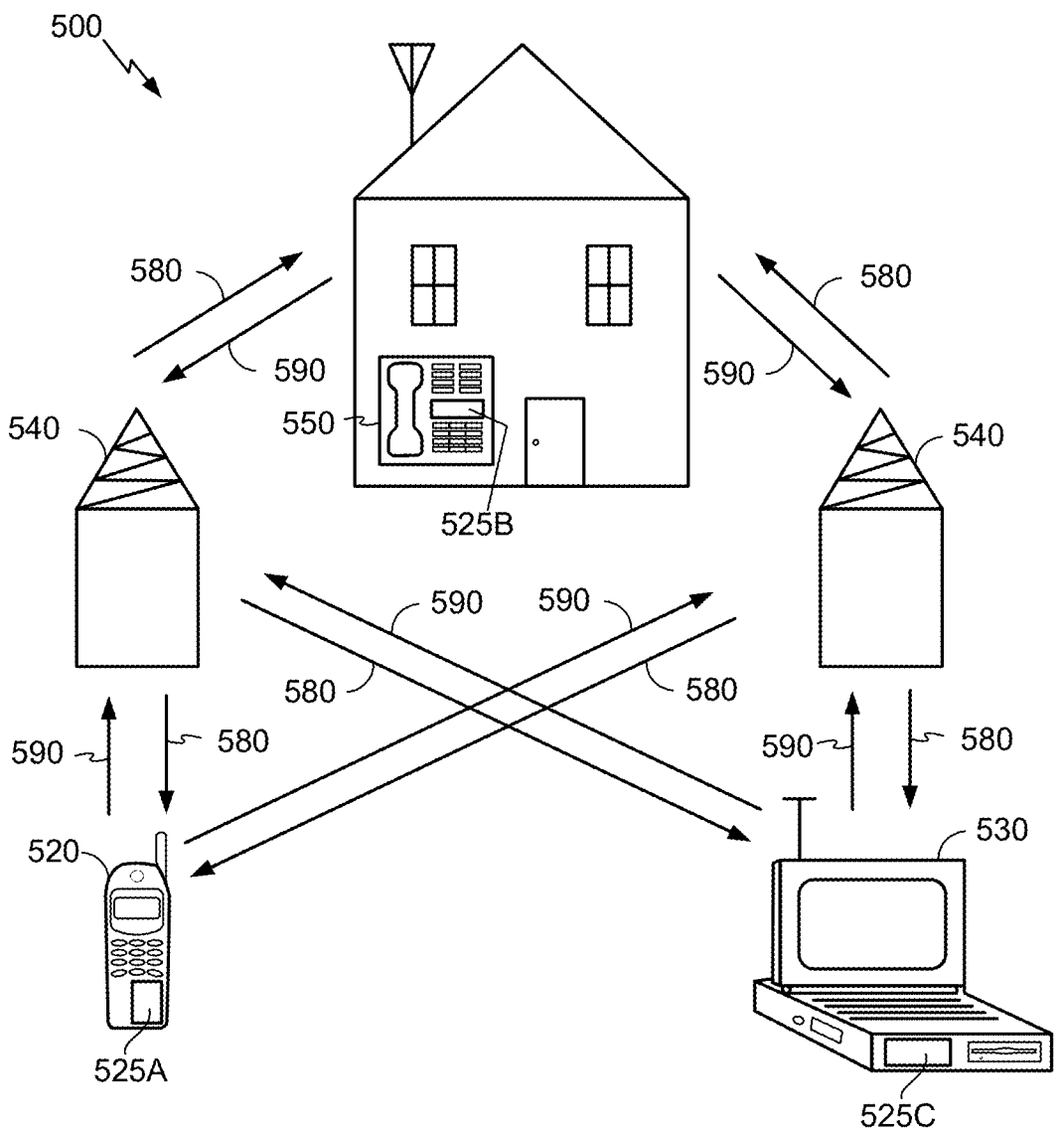
FIG. 5 is a block diagram showing an exemplary wireless communications system in which a configuration of the disclosure may be advantageously employed.

FIG. 5 is a block diagram showing an exemplary wireless communications system 500 in which an aspect of the present disclosure may be advantageously employed. For purposes of illustration, FIG. 5 shows three remote units 520, 530, and 550 and two base stations 540. It will be recognized that wireless communications systems may have many more remote units and base stations. Remote units 520, 530, and 550 include integrated circuit (IC) devices 525A, 525C, and 525B that include the disclosed non-periodic limits mitigation. It will be recognized that other devices may also include the non-periodic limits mitigation, such as the base stations 540, switching devices, and network equipment. FIG. 5 shows forward link signals 580 from the base stations 540 to the remote units 520, 530, and 550, and reverse link signals 590 from the remote units 520, 530, and 550 to the base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a communications device, personal digital assistant (PDA), a fixed location data unit, such as meter reading equipment, or other device that stores or retrieves data or computer instructions, or combinations thereof. Although FIG. 5 illustrates remote units according to the aspects of the present disclosure, the present disclosure is not limited to these exemplary illustrated units. Aspects of the present disclosure may be suitably employed in many devices, which include the disclosed non-periodic limits mitigation.

Figure 6:
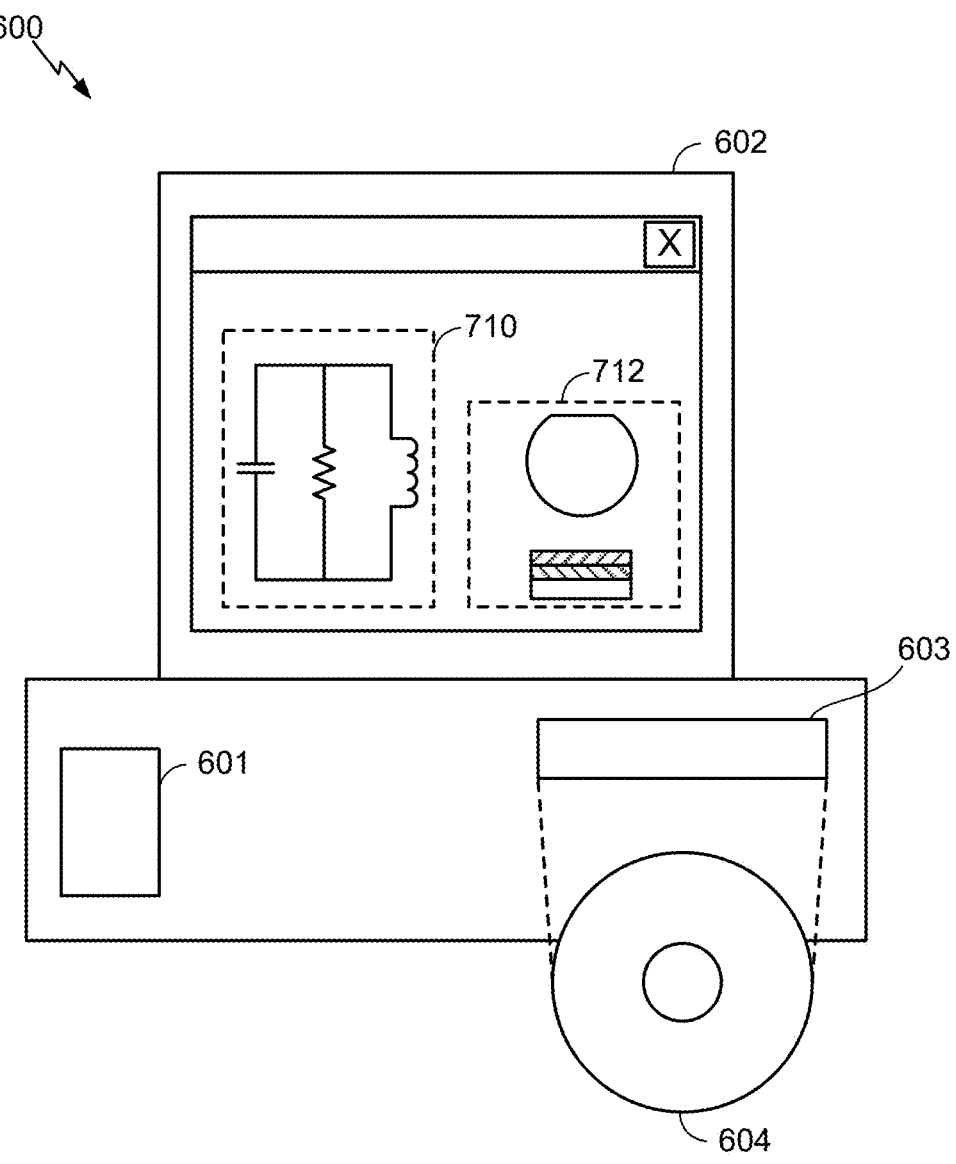
FIG. 6 is a block diagram illustrating a design workstation used for circuit, layout, and logic design of a semiconductor component according to one configuration.

FIG. 6 is a block diagram illustrating a design workstation used for circuit, layout, and logic design of a semiconductor component, such as the non-periodic limits mitigation disclosed above. A design workstation 600 includes a hard disk 601 containing operating system software, support files, and design software such as Cadence or OrCAD. The design workstation 600 also includes a display 602 to facilitate design of a circuit 610, such as a control loop sub-system voltage management system. A storage medium 604 is provided for tangibly storing the design of the circuit 610 (e.g., the voltage regulator noise mitigation with processor control). The design of the circuit 610 or a limits management hardware (LMH) component 612 may be stored on the storage medium 604 in a file format such as GDSII or GERBER. The storage medium 604 may be a compact disc read-only memory (CD-ROM), digital versatile disc (DVD), hard disk, flash memory, or another appropriate device. Furthermore, the design workstation 600 includes a drive apparatus 603 for accepting input from or writing output to the storage medium 604.

Data recorded on the storage medium 604 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit 610 or the LMH component 612 by decreasing the number of processes for designing semiconductor wafers.

Implementation examples are described in the following numbered clauses:

1. A method for non-periodic limits mitigation, the method comprising:
   monitoring operation of each processor thread during thread pipeline execution;
   detecting a limits management condition based on each of the processor threads during the thread pipeline execution; and
   controlling application of a limits mitigation operation to perform non-periodic application of the limits mitigation operation to the thread pipeline execution.

2. The method of clause 1, in which controlling application of the limits mitigation operation comprises providing a dither control to perturb application of the limits mitigation operation.

3. The method of clause 1, in which controlling application of the limits mitigation operation comprises modulating application of the limits mitigation operation.

4. The method of clause 1, in which controlling application of the limits mitigation operation comprises randomly applying the limits mitigation operation.

5. The method of clause 1, in which the limits mitigation operation comprises a throttle control signal applied to the thread pipeline execution.

6. The method of any of clauses 1-5, in which controlling application of the limits mitigation operation comprises accessing configuration register values to configure a dither control circuit.

7. The method of clause 6, in which the dither control circuit is integrated with a multi-threaded processor.

8. The method of clause 6, in which the dither control circuit comprises a modulation block and a random number generator block selected according to the configuration register values.

9. The method of any of clauses 1-8, in which controlling application of the limits mitigation operation comprises modulating application of a throttle control signal to the thread pipeline execution.

10. The method of any of clauses 1-9, in which detecting the limits management condition comprises detecting a power limits condition, a current limits condition, and/or a thermal limits condition.

11. A non-periodic limits mitigation system, comprising:
    a multi-threaded processor comprising a dither control circuit to control application of a limits mitigation operation to perform non-periodic application of the limits mitigation operation to a thread pipeline execution when a limits management condition is detected based on the thread pipeline execution of the multi-threaded processor.

12. The non-periodic limits mitigation system of clause 11, in which the dither control circuit is further to perturb application of the limits mitigation operation.

13. The non-periodic limits mitigation system of clause 11, in which the dither control circuit is further to modulate application of the limits mitigation operation.

14. The non-periodic limits mitigation system of clause 11, in which the dither control circuit is further to randomly apply the limits mitigation operation.

15. The non-periodic limits mitigation system of clause 11, in which the limits mitigation operation comprises a throttle control signal applied to the thread pipeline execution.

16. The non-periodic limits mitigation system of any of
clauses 11-15, in which the multi-threaded processor is
configured to access configuration register values to
configure the dither control circuit.

17. The non-periodic limits mitigation system of any of
clauses 11-16, in which the dither control circuit is
integrated with a limits management hardware (LMH).

18. The non-periodic limits mitigation system of any of
clauses 11-17, in which the dither control circuit com-
prises a modulation block and a random number gen-
erator block selected according to configuration regis-
ter values.

19. The non-periodic limits mitigation system of any of
clauses 11-18, in which the dither control circuit is
further to modulate application of a throttle control
signal to the thread pipeline execution.

20. The non-periodic limits mitigation system of any of
clauses 11-19, in which the limits management condi-
tion comprises a power limits condition, a current
limits condition, and/or a thermal limits condition.

For a firmware and/or software implementation, the meth-
odologies may be implemented with modules (e.g., proce-
dures, functions, and so on) that perform the functions
described herein. A machine-readable medium tangibly
embodying instructions may be used in implementing the
methodologies described herein. For example, software
codes may be stored in a memory and executed by a
processor unit. Memory may be implemented within the
processor unit or external to the processor unit. As used
herein, the term "memory" refers to types of long term, short
term, volatile, nonvolatile, or other memory and is not
limited to a particular type of memory or number of memo-
ries, or type of media upon which memory is stored.

If implemented in firmware and/or software, the functions
may be stored as one or more instructions or code on a
non-transitory computer-readable medium. Examples
include computer-readable media encoded with a data struc-
ture and computer-readable media encoded with a computer
program. Computer-readable media includes physical com-
puter storage media. A storage medium may be an available
medium that can be accessed by a computer. By way of
example, and not limitation, such computer-readable media
can include random access memory (RAM), read-only
memory (ROM), electrically erasable programmable read-
only memory (EEPROM), compact disc read-only memory
(CD-ROM) or other optical disk storage, magnetic disk
storage or other magnetic storage devices, or other medium
that can be used to store desired program code in the form
of instructions or data structures and that can be accessed by
a computer. Disk and disc, as used herein, include compact
disc (CD), laser disc, optical disc, digital versatile disc
(DVD), floppy disk and Blu-ray® disc, where disks usually
reproduce data magnetically, while discs reproduce data
optically with lasers. Combinations of the above should also
be included within the scope of computer-readable media.

In addition to storage on computer-readable medium,
instructions and/or data may be provided as signals on
transmission media included in a communication apparatus.
For example, a communication apparatus may include a
transceiver having signals indicative of instructions and
data. The instructions and data are configured to cause one
or more processors to implement the functions outlined in
the claims.

Although the present disclosure and its advantages have
been described in detail, various changes, substitutions, and
alterations can be made herein without departing from the
technology of the disclosure as defined by the appended claims. For example, relational terms, such as "above" and
"below" are used with respect to a substrate or electronic
device. Of course, if the substrate or electronic device is
inverted, above becomes below, and vice versa. Addition-
ally, if oriented sideways, above, and below may refer to
sides of a substrate or electronic device. Moreover, the scope
of the present application is not intended to be limited to the
configurations of the process, machine, manufacture, com-
position of matter, means, methods, and steps described in
the specification. As one of ordinary skill in the art will
readily appreciate from the disclosure, processes, machines,
manufacture, compositions of matter, means, methods, or
steps, presently existing or later to be developed that per-
form substantially the same function, or achieve substan-
tially the same result as the corresponding configurations
described herein, may be utilized according to the present
disclosure. Accordingly, the appended claims are intended to
include within their scope such processes, machines, manu-
facture, compositions of matter, means, methods, or steps.

Those of skill would further appreciate that the various
illustrative logical blocks, modules, circuits, and algorithm
steps described in connection with the disclosure herein may
be implemented as electronic hardware, computer software,
or combinations of both. To clearly illustrate this inter-
changeability of hardware and software, various illustrative
components, blocks, modules, circuits, and steps have been
described above generally in terms of their functionality.
Whether such functionality is implemented as hardware or
software depends upon the application and design con-
straints imposed on the overall system. Skilled artisans may
implement the described functionality in varying ways for
each application, but such implementation decisions should
not be interpreted as causing a departure from the scope of
the present disclosure.

The various illustrative logical blocks, modules, and
circuits described in connection with the disclosure herein
may be implemented or performed with a general-purpose
processor, a digital signal processor (DSP), an application-
specific integrated circuit (ASIC), a field-programmable
gate array (FPGA) or other programmable logic device,
discrete gate or transistor logic, discrete hardware compo-
nents, or any combination thereof designed to perform the
functions described herein. A general-purpose processor
may be a microprocessor, but, in the alternative, the pro-
cessor may be any conventional processor, controller, micro-
controller, or state machine. A processor may also be imple-
mented as a combination of computing devices, e.g., a
combination of a DSP and a microprocessor, multiple micro-
processors, one or more microprocessors in conjunction
with a DSP core, or any other such configuration.

The steps of a method or algorithm described in connec-
tion with the present disclosure may be embodied directly in
hardware, in a software module executed by a processor, or
in a combination of the two. A software module may reside
in random access memory (RAM), flash memory, read-only
memory (ROM), erasable programmable read-only memory
(EPROM), electrically erasable programmable read-only
memory (EEPROM), registers, hard disk, a removable disk,
a compact disc read-only memory (CD-ROM), or any other
form of storage medium known in the art. An exemplary
storage medium is coupled to the processor such that the
processor can read information from, and write information
to, the storage medium. In the alternative, the storage
medium may be integral to the processor. The processor and
the storage medium may reside in an application-specific
integrated circuit (ASIC). The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general-purpose or special-purpose computer. By way of example, and not limitation, such computer-readable media can include random access memory (RAM), read-only memory (ROM), electrically erasable programmable read-only memory (EEPROM), compact disc read-only memory (CD-ROM) or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

The previous description of the present disclosure is provided to enable any person skilled in the art to make or use the disclosure. Various modifications to the present disclosure will be readily apparent to those skilled in the art, and the generic principles defined herein may be applied to other variations without departing from the spirit or scope of the disclosure. Thus, the present disclosure is not intended to be limited to the examples and designs described herein but is to be accorded the widest scope consistent with the principles and novel features disclosed herein.

What is claimed:

1. A method for non-periodic limits mitigation, the method comprising:

monitoring operation of each processor thread during thread pipeline execution;

detecting a limits management condition based on each of the processor threads during the thread pipeline execution; and controlling application of a limits mitigation operation to perform non-periodic application of the limits mitigation operation to the thread pipeline execution, wherein controlling application of the limits mitigation operation comprises accessing configuration register values to configure a dither control circuit, and wherein the dither control circuit comprises a modulation block and a random number generator block selected according to the configuration register values.

2. The method of claim 1, in which controlling application of the limits mitigation operation comprises providing a dither control to perturb application of the limits mitigation operation.

3. The method of claim 1, in which controlling application of the limits mitigation operation comprises modulating application of the limits mitigation operation.

4. The method of claim 1, in which controlling application of the limits mitigation operation comprises randomly applying the limits mitigation operation.

5. The method of claim 1, in which the limits mitigation operation comprises a throttle control signal applied to the thread pipeline execution.

6. The method of claim 1, in which the dither control circuit is integrated with a multi-threaded processor.

7. The method of claim 1, in which controlling application of the limits mitigation operation comprises modulating application of a throttle control signal to the thread pipeline execution.

8. The method of claim 1, in which detecting the limits management condition comprises detecting a power limits condition, a current limits condition, and/or a thermal limits condition.

9. A non-periodic limits mitigation system, comprising:

a multi-threaded processor comprising a dither control circuit to control application of a limits mitigation operation to perform non-periodic application of the limits mitigation operation to a thread pipeline execution when a limits management condition is detected based on the thread pipeline execution of the multi-threaded processor, wherein the dither control circuit comprises a modulation block and a random number generator block selected according to configuration register values.

10. The non-periodic limits mitigation system of claim 9, in which the dither control circuit is further to perturb application of the limits mitigation operation.

11. The non-periodic limits mitigation system of claim 9, in which the dither control circuit is further to modulate application of the limits mitigation operation.

12. The non-periodic limits mitigation system of claim 9, in which the dither control circuit is further to randomly apply the limits mitigation operation.

13. The non-periodic limits mitigation system of claim 9, in which the limits mitigation operation comprises a throttle control signal applied to the thread pipeline execution.

14. The non-periodic limits mitigation system of claim 9, in which the multi-threaded processor is configured to access configuration register values to configure the dither control circuit.

15. The non-periodic limits mitigation system of claim 9, in which the dither control circuit is integrated with a limits management hardware (LMH).

16. The non-periodic limits mitigation system of claim 9, in which the dither control circuit is further to modulate application of a throttle control signal to the thread pipeline execution.

17. The non-periodic limits mitigation system of claim 9, in which the limits management condition comprises a power limits condition, a current limits condition, and/or a thermal limits condition.

* * * * *